(No Model.)
W. DICKIE.
PLOW.
No. 556,256. Patented Mar. 10, 1896.
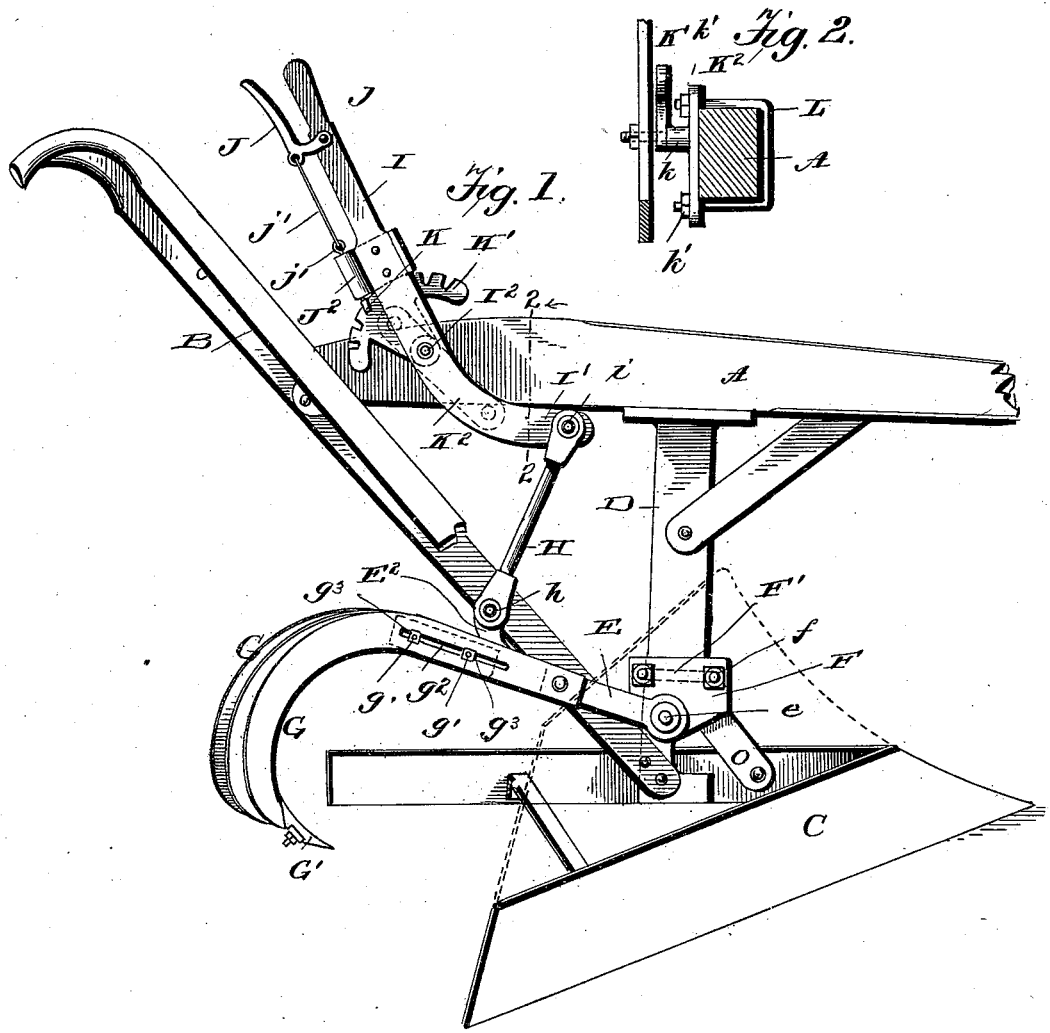
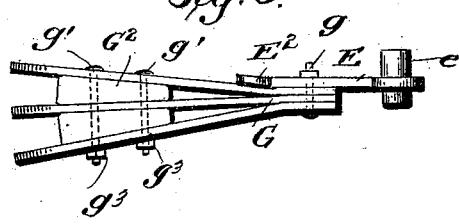
Witnesses:
L. C. Hills.
E. H. Bond.
Inventor:
William Dickie,
by E. B. Stocking
Atty.

UNITED STATES PATENT OFFICE.

WILLIAM DICKIE, OF GILLESPIE, ILLINOIS.

PLOW.

SPECIFICATION forming part of Letters Patent No. 556,256, dated March 10, 1896.

Application filed July 15, 1895. Serial No. 556,064. (No model.)

*To all whom it may concern:*

Be it known that I, WILLIAM DICKIE, a citizen of the United States, residing at Gillespie, in the county of Macoupin, State of Illinois, have invented certain new and useful Improvements in Plows, of which the following is a specification, reference being had therein to the accompanying drawings.

This invention relates to certain new and useful improvements in plows and plow attachments, and it has for its objects among others to provide a simple and cheap attachment comprising essentially a hinged beam or bar having shanks for the attachment of shovels, plows or teeth to run back or under the plow-point for pulverizing the ground deeper than the plow, and capable of being thrown up out of operative position when desired. The hinged beam carries the shanks or bars to which the shovels or other devices are attached, and between these are arranged wedge-shaped pieces which may be adjusted backward or forward to narrow or widen the same so as to fit any size plow.

Other objects and advantages of the invention will hereinafter appear, and the novel features thereof will be particularly pointed out in the appended claims.

The invention in this instance resides in the peculiar combination and the construction and arrangement and adaptation of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 1 is a perspective view showing a plow and its attachments constructed in accordance with my invention with portions broken away. Fig. 2 is a vertical section on the line 2 2 of Fig. 1, looking in the direction of the arrow. Fig. 3 is a detail in plan showing the hinged arm, the shanks and the wedge-shaped pieces.

Like letters of reference indicate like parts throughout the several views.

Referring now to the details of the drawings by letter, A designates the beam; B, the handles; C, the plow, and D the standard, all of any well-known or approved form of construction.

E is a beam or bar pivotally connected, as at $e$, on a plate F, which is designed to be detachably and adjustably secured to the standard or upright D in any suitable manner. In this instance it is shown as connected by a stirrup F' embracing the standard or upright and the ends of said stirrup are screw-threaded and provided with nuts $f$, by means of which the same may be firmly held to the standard, thus rendering it not only detachable but vertically adjustable, if desired. This arm or bar extends rearwardly between the handles and has detachably and pivotally connected therewith upon a bolt or pivot $g$ the beams G, which diverge, as seen best in Figs. 1 and 3, and are curved at their rear ends, as seen best in Fig. 1, and designed to carry at their lower ends shovels, plows or any other desired implements G', which may be detachably connected therewith in any suitable manner. The rear end of the arm E extends upwardly, as seen at $E^2$, for a purpose which will hereinafter appear. The beams G are designed to be spread more or less apart, as occasion may require, by means of the wedges $G^2$, which are placed between the beams, as seen clearly in Fig. 3, and are rendered adjustable backward and forward as may be desired by means of the bolts $g'$, which pass through slots $g^2$ extending lengthwise of the said beams and receiving upon their ends the nuts $g^3$, by means of which they may be tightened in their adjusted positions, as will be readily understood.

H is a rod pivotally connected at its lower end in any suitable manner, as at $h$, with the upwardly-curved portion $E^2$ of the arm E, while its upper end is pivotally connected, as at $i$, with the lower forwardly extending and curved portion I' of the operating-lever I, which is pivotally connected at $I^2$ on the beam A and has pivotally connected thereon, as at $j$, the supplemental lever J connected by rod or other connection $j'$ with the arm J' working in a barrel $J^2$ secured to the lever I and carrying a pawl K adapted to engage the notches of the segment K', which is secured to the beam, in this instance the segment K' being shown as carried by the lateral arm $k$ projecting from the plate K², which is secured to the beam A by the stirrup L, which clasps or embraces the beam and has its ends screw-threaded and after passing through said plate receives the nuts k', as clearly shown in Fig. 2.

The operation will be readily understood. When it is not desired to use the shovels or other implements carried by the arms G, the lever is actuated so as to throw the latter up out of position, as indicated in Fig. 1. When it is desired that they should be thrown into position to break up and cultivate the earth thrown up by the plow or to pulverize the subsoil in the furrow of the plow underneath where the plow has taken off the top of the furrow, the lever is actuated so as to throw the arm E, and consequently the arms and implements carried thereby, down into operative position.

The implements and the beams carrying the same can be spread out more or less, according to the width of the plow by the adjustment of the blocks G².

The device is simple, cheap, can be readily attached to plows of all sorts, and in practice has proved most efficient for the purposes for which it is designed.

Modifications in detail may be resorted to without departing from the spirit of the invention or sacrificing any of its advantages.

It is evident that my improvements may be attached to riding-plows in any suitable manner for the purpose of pulverizing and plowing the ground deeper than the plow proper has cut.

What I claim as new is—

1. The combination with a plow, of an arm pivotally mounted thereon, longitudinally-slotted beams mounted on said arm and diverging from their connection therewith, and wedge-shaped blocks adapted to be adjusted between said beams, substantially as specified.

2. The combination with a plow, of an arm detachably connected with the standard thereof, beams pivotally mounted on said arm and diverging from their point of connection therewith and longitudinally slotted, and wedge-shaped blocks arranged between said beams and having bolts therethrough and adjustable in said slots, substantially as specified.

3. The combination with a plow and the pivoted arm carrying the beams and their implements, of a lever pivoted between its ends on the beam independent of said arm and a rod pivotally connected with said lever and said arm and extending at substantially right angles thereto for raising and lowering the arm and beams, substantially as specified.

4. The combination with a plow, and the pivoted arm carrying the beams and their implements, of a lever pivoted between its ends on the beam independent of said arm and a rod pivotally connected with said lever and said arm and extending at right angles thereto for raising and lowering the arm and beams, a notch-segment, and a lever mounted on the operating-lever and carrying a pawl for engagement with said segment, substantially as specified.

5. The combination with a plow, of the arm carrying the beams and shovels and having its rear end extending upwardly, an operating-lever pivoted between its ends on the plow-beam, and a rod extending at right angles to and pivotally connecting the forward end of said lever with the upwardly-extended end of said arm, substantially as specified.

In testimony whereof I affix my signature in presence of two witnesses.

WILLIAM DICKIE.

Witnesses:
JACOB QUERBACH,
HERMAN BEHRENS.